(12) United States Patent
Izuma (10) Patent No.: US 12,275,367 B2
(45) Date of Patent: Apr. 15, 2025

(54) IGNITER ASSEMBLY AND GAS GENERATION DEVICE

(71) Applicant: Daicel Corporation, Osaka (JP)

(72) Inventor: Toshihiro Izuma, Tokyo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 18/388,639

(22) Filed: Nov. 10, 2023

(65) Prior Publication Data

US 2024/0075900 A1    Mar. 7, 2024

Related U.S. Application Data

(63) Continuation of application No. PCT/JP2022/019894, filed on May 11, 2022.

(30) Foreign Application Priority Data

May 11, 2021 (JP) ................... 2021-080518

(51) Int. Cl.
*B60R 21/264* (2006.01)
*B60R 21/274* (2011.01)
*B60R 21/26* (2011.01)

(52) U.S. Cl.
CPC .......... *B60R 21/264* (2013.01); *B60R 21/274* (2013.01); *B60R 2021/26029* (2013.01); *B60R 2021/26076* (2013.01)

(58) Field of Classification Search
CPC .......... B60R 2021/26082; B60R 21/26; B60R 2021/26076; B60R 2021/26029
See application file for complete search history.

(56) References Cited

U.S. PATENT DOCUMENTS 5,409,259 A * 4/1995 Cunningham ...... B60R 21/2644
422/166
6,012,737 A    1/2000 Van Wynsberghe et al.
(Continued)

FOREIGN PATENT DOCUMENTS

DE  19851263 A1   6/1999
DE  19933922 A1   2/2000
(Continued)

OTHER PUBLICATIONS

JP_2002090097_A machine translation from espacenet (Year: 2024).*
(Continued)

*Primary Examiner* — Paul N Dickson
*Assistant Examiner* — Maxwell L Meshaka
(74) *Attorney, Agent, or Firm* — Morgan, Lewis & Bockius LLP (57) ABSTRACT

An igniter assembly includes: an ignition device including: an igniter including an ignition portion airtightly accommodating an ignition charge and a conductive portion that supplies an ignition current for igniting the ignition charge, an igniter holding portion having a tubular shape and holding the igniter, and a fixing member made of a resin, interposed between the igniter and the igniter holding portion, and fixing the igniter to the igniter holding portion; a case having a bottomed tubular shape and accommodating a first gas generating agent and the ignition portion of the igniter, and a partition wall partitioning an inside of the case into a space in which the igniter and the fixing member are disposed and a space in which the first gas generating agent is accommodated, the partition wall having moisture impermeability. The partition wall is fixed and in contact with the case.

19 Claims, 8 Drawing Sheets

(56) References Cited

U.S. PATENT DOCUMENTS

| | | | |
|---|---|---|---|
| 6,709,011 B2 * | 3/2004 | Neunzert | B60R 21/2644 280/736 |
| 8,777,258 B2 * | 7/2014 | Kobayashi | B60R 21/2644 280/736 |
| 9,688,235 B2 * | 6/2017 | Yamauchi | F42B 3/121 |
| 9,776,592 B2 * | 10/2017 | Lang | C22C 38/40 |
| 9,950,688 B2 * | 4/2018 | Yamashita | B60R 21/261 |
| 9,994,188 B1 * | 6/2018 | Herfert | B60R 21/264 |
| 9,994,190 B2 * | 6/2018 | Izuma | B01J 7/00 |
| 10,336,288 B2 * | 7/2019 | Izuma | B60R 21/2644 |
| 10,442,389 B2 * | 10/2019 | Izuma | B60R 21/264 |
| 10,773,682 B2 * | 9/2020 | Izuma | B60R 21/264 |
| 10,814,827 B2 * | 10/2020 | Izuma | B01J 7/00 |
| 11,104,101 B2 * | 8/2021 | Larsen | B32B 7/12 |
| 11,110,885 B2 * | 9/2021 | Koyama | B60R 21/2644 |
| 2002/0063421 A1 | 5/2002 | Werneth et al. | |
| 2002/0113420 A1 * | 8/2002 | Neunzert | B60R 21/2644 280/736 |
| 2002/0174792 A1 | 11/2002 | Kubozuka et al. | |
| 2004/0226472 A1 | 11/2004 | Oda | |
| 2005/0189754 A1 | 9/2005 | Matsuda et al. | |
| 2006/0202455 A1 | 9/2006 | Matsuda et al. | |
| 2012/0247361 A1 * | 10/2012 | Kobayashi | B60R 21/2644 102/530 |
| 2015/0053697 A1 * | 2/2015 | Lang | C22C 38/04 72/370.13 |
| 2016/0016532 A1 | 1/2016 | Kapfelsperger et al. | |
| 2016/0052481 A1 * | 2/2016 | Yamauchi | B60R 21/2644 102/530 |
| 2017/0050609 A1 * | 2/2017 | Yamashita | B60R 21/261 |
| 2017/0166160 A1 * | 6/2017 | Izuma | B60R 21/2644 |
| 2018/0170303 A1 * | 6/2018 | Izuma | B60R 21/2644 |
| 2019/0023219 A1 * | 1/2019 | Izuma | B60R 21/2644 |
| 2019/0061677 A1 * | 2/2019 | Izuma | B60R 21/26 |
| 2019/0217808 A1 * | 7/2019 | Izuma | B60R 21/264 |
| 2020/0139925 A1 * | 5/2020 | Koyama | B60R 21/264 |
| 2020/0290554 A1 * | 9/2020 | Izuma | B60R 21/264 |
| 2020/0346434 A1 * | 11/2020 | Larsen | B32B 7/12 |
| 2021/0179011 A1 | 6/2021 | Bendel et al. | |
| 2022/0126784 A1 | 4/2022 | Yabuuchi et al. | |
| 2023/0117476 A1 * | 4/2023 | Ono | B60R 21/272 102/530 |
| 2024/0075900 A1 * | 3/2024 | Izuma | B60R 21/264 |
| 2024/0132011 A1 * | 4/2024 | Hakozaki | B60R 21/217 |

FOREIGN PATENT DOCUMENTS

| | | | | |
|---|---|---|---|---|
| DE | 112005002102 T5 | 8/2007 | | |
| DE | 602005002281 T2 | 1/2008 | | |
| DE | 102014010618 A1 | 1/2016 | | |
| DE | 102017128886 A1 | 6/2019 | | |
| JP | H09-323614 A | 12/1997 | | |
| JP | 2002-090097 A | 3/2002 | | |
| JP | 2003-161599 A | 6/2003 | | |
| JP | 2013-063780 A | 4/2013 | | |
| JP | 2017190003 A | * 10/2017 | | B01J 7/00 |
| JP | 2019069677 A | * 5/2019 | | B01D 46/24 |
| JP | 2019098956 A | * 6/2019 | | B60R 21/263 |
| JP | 2020-203498 A | 12/2020 | | |
| JP | 2021120249 A | * 8/2021 | | B60R 21/2644 |
| JP | 2021146927 A | * 9/2021 | | |
| JP | 2021171730 A | * 11/2021 | | B01D 39/10 |
| WO | 01/013484 A2 | 2/2001 | | |
| WO | WO-2016017465 A1 | * 2/2016 | | B01J 7/00 |
| WO | WO-2016042931 A1 | * 3/2016 | | B01J 7/00 |
| WO | WO-2017006697 A1 | * 1/2017 | | B60R 21/26 |
| WO | 2020/149399 A1 | 7/2020 | | |

OTHER PUBLICATIONS

JP_2013063780_A machine translation from espacenet (Year: 2024).*
JP_H09323614_A machine translation from espacenet (Year: 2024).*
International Search Report issued in the corresponding Application No. PCT/JP2022/019894, mailed Jul. 12, 2022.
Written Opinion of the International Search Authority issued in the corresponding Application No. PCT/JP2022/019894, mailed Jul. 12, 2022.
Office Action issued in corresponding German Patent Application No. 11 2022 002 503.4, dated Feb. 18, 2025.

* cited by examiner

IGNITER ASSEMBLY AND GAS GENERATION DEVICE

TECHNICAL FIELD

The present disclosure relates to an igniter assembly and a gas generation device.

BACKGROUND ART

There has been proposed a known igniter assembly including a cup in which a gas generating agent is accommodated and of which one end in an axial direction is configured as an open end, and a holder that is coaxially assembled to close the open end of the cup (e.g., Patent Document 1). In this igniter assembly, the open end is provided with an annular welding portion, and the cup is fixed to the holder.

An initiator assembly formed by integrating, with a resin, an electric initiator and a metal collar surrounding at least a part of the electric initiator has also been proposed (e.g., Patent Document 2).

An igniter assembly in which a cup-shaped receiving portion of an igniter is welded to a base portion or the like has also been proposed (e.g., Patent Document 3).

CITATION LIST

Patent Document
Patent Document 1: WO 2020/149399
Patent Document 2: JP 2003-161599 A
Patent Document 3: US 2002/0063421 A

SUMMARY

Technical Problem

According to the technique described in Patent Document 1, assembly work including processing of a flange, crimping work, and attaching of a sealing member is complicated. On the other hand, when an igniter and a collar are integrated by a resin that is injection molded, airtightness may be impaired due to shrinkage of the resin during curing. In the technique described in Patent Document 2, it is necessary to determine the structure of the collar or select the resin in consideration of the shrinkage rate, and it is difficult to reliably ensure airtightness.

The technique of the present disclosure has been made in view of the above problems, and an object thereof is to provide a technique for ensuring airtightness of a combustion chamber.

Solution to Problem

An igniter assembly of one embodiment of the present disclosure includes: an ignition device including: an igniter including an ignition portion airtightly accommodating an ignition charge and a conductive portion configured to supply an ignition current for igniting the ignition charge, an igniter holding portion having a tubular shape and holding the igniter in a state of surrounding the igniter, and a fixing member made of a resin, interposed between the igniter and the igniter holding portion, and fixing the igniter to the igniter holding portion; a case having a bottomed tubular shape and accommodating a first gas generating agent and the ignition portion of the igniter, on one side in an axial direction of the igniter holding portion; and a partition wall partitioning an inside of the case into a space in which the igniter and the fixing member are disposed and a space in which the first gas generating agent is accommodated, the partition wall having moisture impermeability, in which the partition wall is fixed in a state of being in contact with the case and is welded all around to at least one of the igniter holding portion or the case.

Since the partition wall as described above is welded all around to the igniter holding portion or the case, for example, moisture can be prevented from entering from between the fixing member made of a resin and the surrounding members. Therefore, airtightness of the combustion chamber can be ensured.

The thickness of the partition wall may be thinner than the thickness of the igniter holding portion and the thickness of the case. This makes it easy to form a partition wall that appropriately ruptures when the igniter operates.

The partition wall may be made of the same material as that of the igniter holding portion or the case. This facilitates the work of welding the partition wall and the igniter holding portion or the case.

The partition wall may have a cup shape including an opening portion opened in one direction, may include an annular portion protruding outward in a radial direction of the cup shape at an edge end of the opening portion, and may be received in the case with the annular portion exposed to an outside. The annular portion may be connected to the igniter holding portion or the case by all-around welding. Such a shape facilitates the work of all-around welding.

A gas generation device according to the present disclosure may include: the igniter assembly described above; a housing accommodating the igniter assembly and provided with a gas discharge port; and a second gas generating agent filled in the housing. The igniter assembly described above can be used by being incorporated in such a gas generation device, for example.

A gas generation device according to the present disclosure may include: a first housing that has a tubular shape, that is filled with a pressurized gas, and of which both ends in an axial direction are each closed by a closing member; a second housing connected to one end of both ends in the axial direction of the first housing; and the igniter assembly described above accommodated in the second housing. The second housing may include a second gas generating agent to be ignited and combust by a combustion product generated by the igniter assembly, the case having the bottomed tubular shape may include, at a closed bottom portion, a through hole through which a combustion product of the first gas generating agent passes, and the through hole and the closing member closing one end of both ends in the axial direction of the first housing may be disposed facing each other.

Advantageous Effects of Invention

According to some embodiments of the present disclosure, it is possible to provide a technique for ensuring airtightness of a combustion chamber.

BRIEF DESCRIPTION OF DRAWINGS

In order to explain the technical features of embodiments of the present disclosure more clearly, the drawings used in the present disclosure are briefly introduced as follow. Obviously, the drawings in the following description are some exemplary embodiments of the present disclosure.

Ordinary person skilled in the art may obtain other drawings and features based on these disclosed drawings without inventive efforts.

DESCRIPTION OF EMBODIMENTS

Embodiments according to the present disclosure will be described below with reference to the accompanying drawings. It should be noted that the respective configurations and the combinations thereof in the respective embodiments are mere examples, and the configurations can be added, omitted, substituted, and differently modified as appropriate within a scope not departing from the spirit of the present disclosure. The present disclosure is not limited by the embodiment and is limited only by the claims.

First Embodiment

Figure 1:
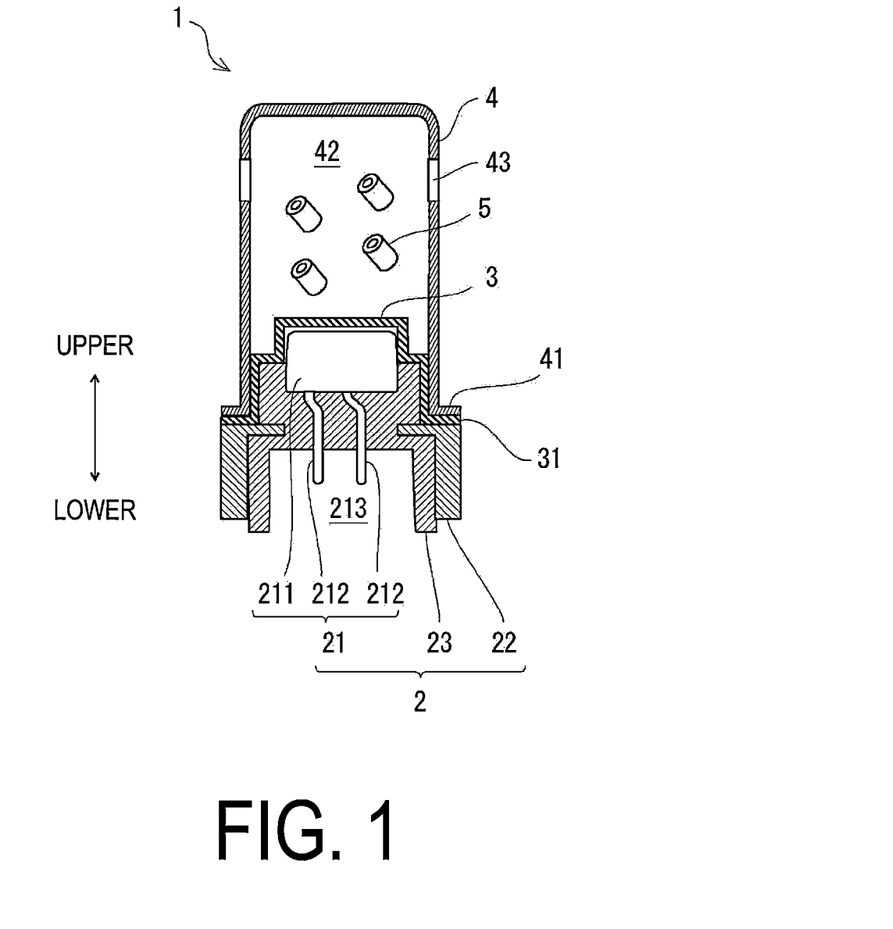
FIG. 1 is a schematic cross-sectional view in an axial direction illustrating an example of an igniter assembly.

FIG. 1 is a schematic cross-sectional view in an axial direction illustrating an example of an igniter assembly according to one embodiment of the disclosure. The igniter assembly 1 is incorporated in a retractor of a seat belt of an automobile, for example, and can be used as a gas generation device for winding up the seat belt upon collision. An igniter assembly 1 of FIG. 1 includes an ignition device 2, a partition wall 3, and a case 4.

Ignition Device

The ignition device 2 includes an igniter body 21 that is ignited by an ignition current, an igniter holding portion 22 that supports the igniter body 21, and a resin portion 23 (also called a "fixing member") interposed between the igniter body 21 and the igniter holding portion 22.

The igniter body 21 includes a metal cup body 211 that accommodates an ignition charge and is sealed, and a pair of electro-conductive pins 212 and 212 for receiving supply of current from the outside. In the present embodiment, for convenience, the cup body 211 side will be described as an upper side, and the electro-conductive pins 212 and 212 side will be described as a lower side. By operating by the ignition current supplied to the pair of electro-conductive pins 212 and 212, the igniter body 21 causes the ignition charge in the cup body 211 to combust and releases the combustion product to the outside of the cup body 211.

The igniter holding portion 22 is a metal collar that supports a side of the igniter body 21, for example. That is, the igniter holding portion 22 is a metal member formed in a tubular shape, and holds the igniter body 21 inside thereof. The inner peripheral surface of the igniter holding portion 22 in contact with the resin portion 23 may be provided with recesses and protrusions, and thus circumferential rotation of the igniter body 21 or the resin portion 23 is suppressed. For the shape of the hole through which the electro-conductive pin 212 extends, the inner peripheral surface may have a shape other than a perfect circle such as a polygon or an ellipse in cross-sectional view. The igniter holding portion 22 may be fixed to a housing of a gas generation device (not illustrated), for example, by welding or the like.

The resin portion 23 is a member that is made of a resin, that is interposed between the igniter body 21 and the igniter holding portion 22 by injection molding, and that fixes the igniter body 21 to the igniter holding portion 22. The resin portion 23 covers the periphery of the side of the igniter body 21 with at least a part of the cup body 211 exposed from the resin portion 23. The resin portion 23 fixes the igniter body 21 to the igniter holding portion 22 by being engaged with the inside of the igniter holding portion 22. However, the entire cup body 211 may be overmolded with the resin portion 23. That is, the entire cup body 211 may be covered with the resin. In the resin portion 23, a connector insertion space 213 into which a connector (not illustrated) for supplying power from an external power source to the pair of electro-conductive pins 212 and 212 can be inserted may be formed inside the igniter holding portion 22. The resin portion 23 covers and holds a part of the pair of electro-conductive pins 212 and 212 with lower ends of the pair of electro-conductive pins 212 and 212 exposed to the connector insertion space 213. The resin portion 23 maintains insulation between the pair of electro-conductive pins 212 and 212. Note that various known techniques can be used for fixing the igniter body 21 and the igniter holding portion 22 and for a connection relationship between the igniter holding portion 22 and the housing. As a material for the resin portion 23, a resin material having excellent heat resistance, durability, corrosion resistance, and the like after curing can be suitably used. Examples of such a resin material include thermoplastic resins such as polybutylene terephthalate resins, polyethylene terephthalate resins, polyamide resins, polypropylene sulfide resins, and polypropylene oxide resins, as well as thermosetting resins such as epoxy resins, but are not limited thereto.

Partition Wall

The partition wall 3 is a member that separates a combustion chamber 42 provided inside the case 4 and a space in which the ignition device 2 is disposed. The partition wall 3 is a member having a bottomed tubular shape (in other words, a cup shape) and disposed above the igniter holding portion 22. The partition wall 3 is made of a material having moisture impermeability, such as a metal like aluminum or iron, or a ceramic. In the present embodiment, the partition wall 3 includes an opening portion on the igniter holding portion 22 side, and is disposed covering the upper side of the cup body 211 of the igniter body 21. A flange portion 31 (also called an "annular portion") protruding laterally (i.e., outside in the radial direction of the partition wall having the cup shape) over the entire circumference is provided in a flange shape at an end of the opening portion of the partition wall 3. The flange portion 31 may be connected to an upper surface of the igniter holding portion 22 by welding, for example. The flange portion 31 and the igniter holding portion 22 may be fixed by a known method (e.g., crimping) other than welding. In this case, it is preferable that the material of the partition wall 3 be the same as the material of the igniter holding portion 22 because welding is made easy. The partition wall 3 functions as a cover for preventing moisture from entering the igniter assembly 1 before the operation of the igniter assembly 1. The partition wall 3 ruptures when the igniter assembly 1 operates, an ignition charge is ignited, and the cup body 211 ruptures. For the partition wall 3 to appropriately rupture, the thickness of the partition wall 3, for example, may be formed to be thinner than the thickness of the igniter holding portion 22 and the thickness of the case 4. For example, when the thickness of the case 4 is from 0.8 mm to 1.5 mm, the partition wall 3 may be from 0.1 mm to 1.0 mm. An insulating layer constituted by, for example, a space or an insulating sheet may be provided between the partition wall 3 and the ignition device 2. By insulating the ignition device 2 from a housing 6, it is possible to suppress malfunction of the ignition device 2 due to static electricity accumulated in the housing 6. In particular, when the partition wall 3 is in contact with the cup body 211, an electrically insulating member such as an insulating sheet is preferably disposed between both.

Case

The case 4 is a member having a bottomed tubular shape and extending upward from the igniter holding portion 22 while surrounding an upper portion of the ignition device 2. That is, the case 4 is formed in a tubular shape with one end (upper end) closed and the other end (lower end) opened. The case 4 includes a flange portion 41 in which the other end protrudes laterally over the entire circumference in a flange shape. The flange portion 41 may be connected to the flange portion 31 of the partition wall 3 by, for example, all-around welding. All-around welding refers to annular welding continuous in the circumferential direction, and refers to achieving a state in which a gap generated between two members serving as welding targets is closed. The combustion chamber 42, which is an internal space where a transfer charge 5 (also called a "first gas generating agent") is accommodated, is formed between the case 4 and the partition wall 3. The transfer charge 5 combusts by the operation of the igniter body 21 and generates combustion gas and the like. A side surface of the case 4 is provided with a plurality of communication holes 43 through which the combustion chamber 42 communicates with the external space. The communication holes 43 are closed by a seal tape (not illustrated) in a state before the ignition device 2 operates. When the ignition device 2 operates, the seal tape ruptures by the pressure of the combustion gas, and the combustion gas is discharged from the communication holes 43 to the outside of the combustion chamber 42. Note that the communication holes 43 only need to allow the inside and the outside of the combustion chamber 42 to communicate at least when the ignition device 2 operates. The communication holes 43 may be closed by a closing member other than the seal tape and need not be closed by the seal tape or the like. Furthermore, the communication holes 43 may be formed not in the side surface of the case 4 but in a top surface. A structure may be adopted in which, in place of the communication holes 43, a slit or a thinned part serving as a weakened part is formed at a side surface or a top surface of the case 4 and the weakened part is to be opened (e.g., a weakened part or a groove disclosed in 21 of JP 2005-238948 A or 10c of JP 2002-200420 A).

Gas Generating Agent

A predetermined gas generating agent is used for the transfer charge 5. The combustion temperature of the transfer charge 5 is, for example, 1000° C. to 1700° C. The transfer charge 5 is made of, for example, guanidine nitrate (41 wt. %), basic copper nitrate (49 wt. %), a binder, and additives. For an individual shape of the transfer charge 5, those having a single-hole columnar shape can be used. However, the transfer charge 5 is not limited to the above.

Manufacturing Method 1

Figure 2:
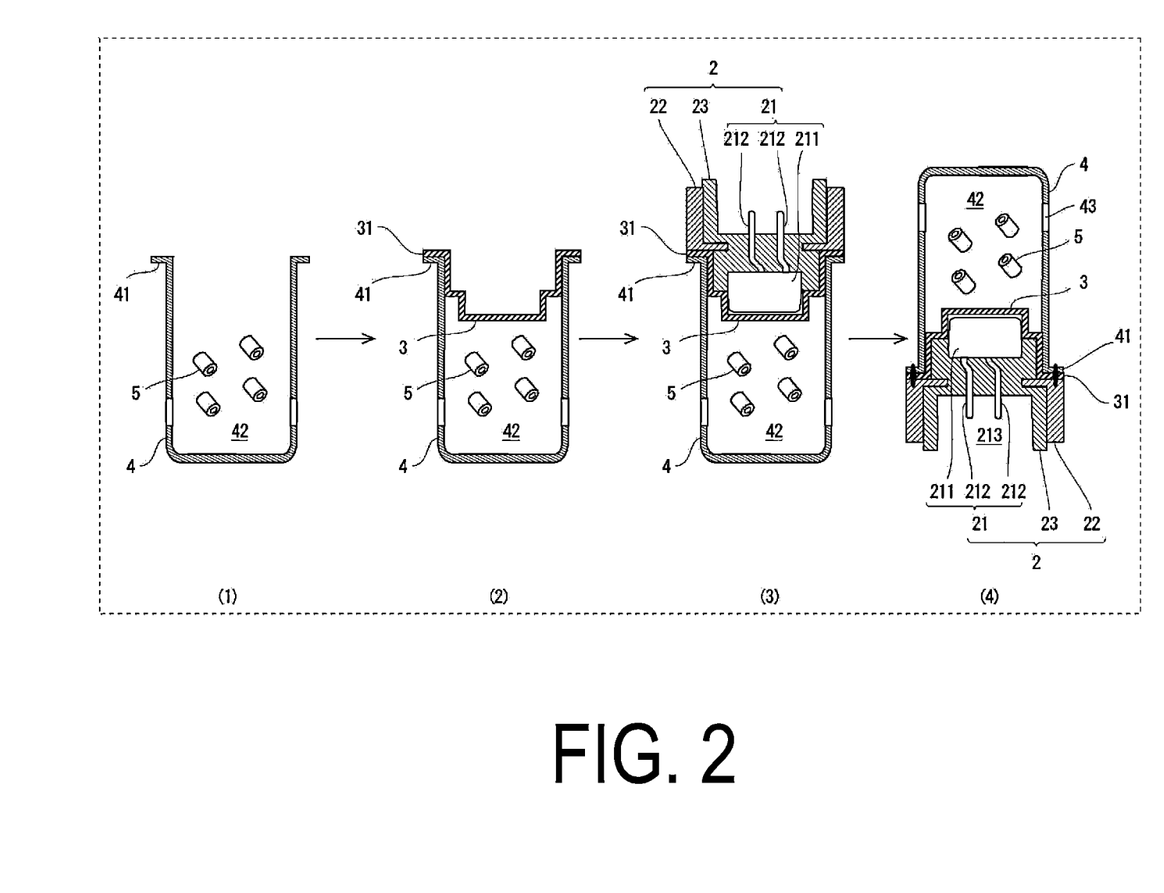
FIG. 2 is a view illustrating an example of a manufacturing method.

The igniter assembly 1 illustrated in FIG. 1 can be manufactured in various methods. FIG. 2 is a view illustrating an example of a manufacturing method. First, the case 4 is filled with the transfer charge 5 as illustrated in (1) of FIG. 2, and the partition wall 3 is inserted into the case 4 as illustrated in (2). In (2), the partition wall 3 is received in the case 4 with the flange portion 31 which is provided at the edge end of the opening portion of the partition wall 3, exposed to the outside. Furthermore, the ignition device 2 is attached with the igniter body 21 inserted into the partition wall 3 as illustrated in (3), and the igniter holding portion 22, the partition wall 3, and the case 4 are welded all around as illustrated in (4). That is, with the flange portion 31 of the partition wall 3 and the flange portion 41 of the case 4 disposed overlapping the upper surface of the igniter holding portion 22, the flange portions 31 and 41 are connected by being continuously fused over the entire circumference by laser welding or the like. In FIG. 2, it is assumed that black elliptical parts are welded. Note that although all-around welding is performed for convenience of assembly, when the igniter assembly 1 is used alone as a gas generator in the examples of FIGS. 1 and 2, the flange portion 31 and the flange portion 41 only need to be welded all around, and the flange portion 31 and the igniter holding portion 22 need not be welded all around.

Manufacturing Method 2

Figure 3:
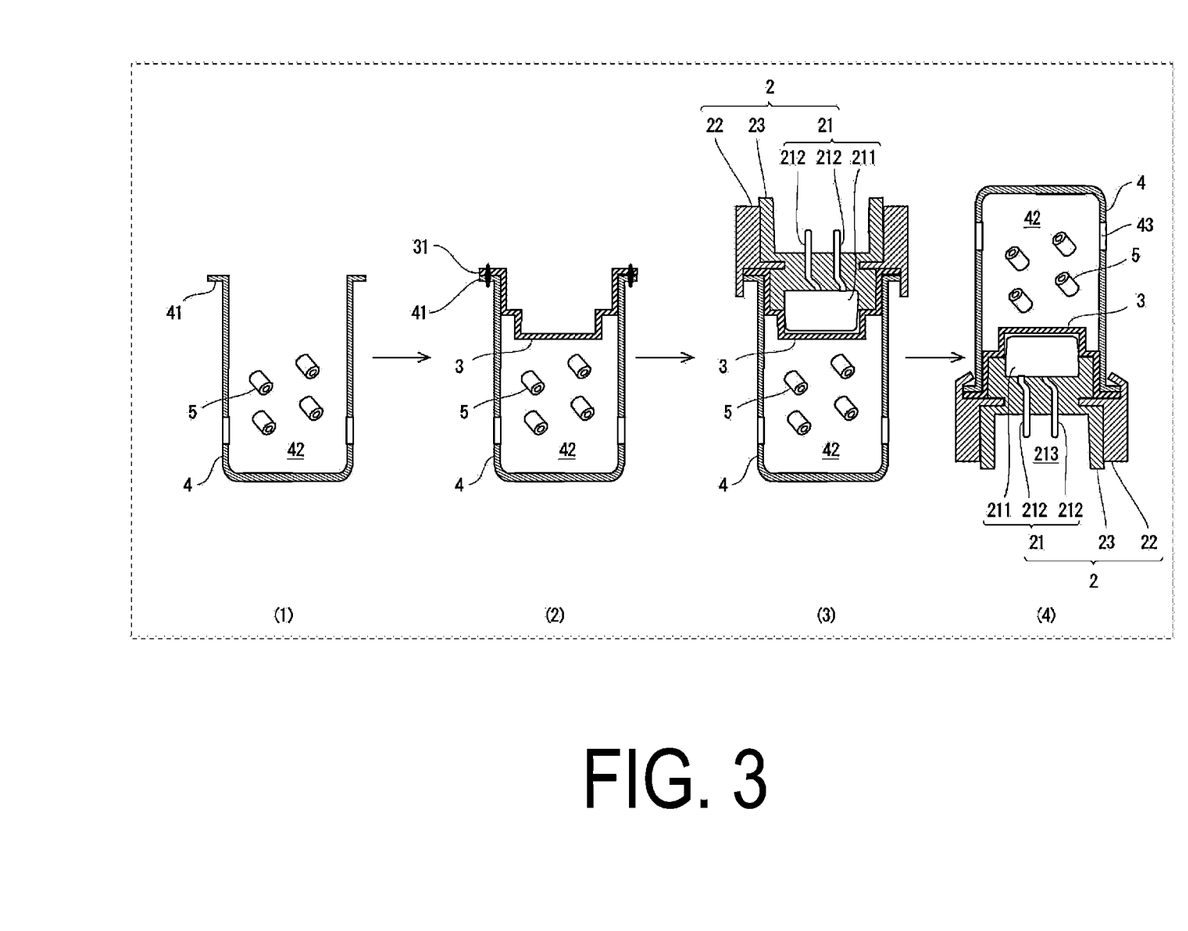
FIG. 3 is a view illustrating another example of the manufacturing method.

The igniter assembly 1 illustrated in FIG. 1 may be manufactured by other methods. FIG. 3 is a view illustrating another example of the manufacturing method. First, the case 4 is filled with the transfer charge 5 as illustrated in (1) of FIG. 3. Then, the partition wall 3 is inserted into the case 4, and the partition wall 3 and the case 4 are welded all around as illustrated in (2). That is, the flange portion 31 of the partition wall 3 and the flange portion 41 of the case 4 are connected by being continuously fused over the entire circumference by laser welding or the like. In FIG. 3 as well, it is assumed that black elliptical parts are welded. Furthermore, the ignition device 2 is attached with the igniter body 21 inserted into the partition wall 3 as illustrated in (3), and is fixed by crimping a part of the igniter holding portion 22, for example, to the flange portion 31 of the partition wall 3 and the flange portion 41 of the case 4 as illustrated in (4). Effects A case where the igniter assembly 1 illustrated in FIG. 1, FIG. 2, or FIG. 3 is used alone as a gas generator will be described below. A case where the igniter assembly 1 is used as a gas generator in combination with other members will be described later. When the ignition device and the igniter holding portion are integrated by a resin that is injection molded, airtightness may be impaired due to shrinkage of the resin during curing. A gap may be generated, for example, between the igniter holding portion 22 and the resin portion 23, or between the electro-conductive pin 212 and the resin portion 23. By fixing the partition wall 3 of the igniter assembly 1 as described above, it is possible to separate the combustion chamber 42 and the space in which the ignition device 2 is disposed, and to prevent moisture from entering the combustion chamber 42 from between the resin portion 23 and surrounding members. That is, since the partition wall 3 and the case 4 are welded all around, there is no possibility that moisture enters the combustion chamber 42 through the gap therebetween. According to the igniter assembly 1 described above, since the partition wall 3 does not allow moisture to pass therethrough, even if there is a gap between the igniter holding portion 22 and the partition wall 3, moisture entering through the gap does not enter the combustion chamber 42. That is, airtightness of the combustion chamber 42 can be ensured. Therefore, in the present embodiment, the flange portion 41 of the case 4 and the flange portion 31 of the partition wall 3 are preferably connected by at least all-around welding, and thus airtightness of the combustion chamber 42 is ensured. The igniter holding portion 22 and the flange portion 31 of the partition wall 3 only need to be fixed by partial welding or another fixing method and do not require all-around welding. Of course, the igniter holding portion 22 and the flange portion 31 may also be welded all around.

According to the first embodiment described above, it is possible to ensure airtightness inside the case in a single welding process, and no sealing member such as a gasket, an O-ring, or a sealing agent is additionally required. Furthermore, by welding the outermost peripheral portions of the flange-shaped parts (the flange portion 31 and the flange portion 41) to each other, it is also possible to suppress an influence of welding heat on the transfer charge 5 in the case. In particular, in the manufacturing method of FIG. 2, by setting the welding parts with respect to the igniter holding portion 22 to the outermost peripheral portions, it is possible to eliminate the influence of the welding heat on the resin portion 23 (deformation of the resin and the like) as much as possible. When the igniter assembly 1 illustrated in FIGS. 1 to 3 is attached to a seat belt retractor, an annular step formed in an attachment port on the retractor side is brought into contact with the flange portion 41, and an opening end of the attachment port is crimped to an end surface (the end surface opposite to the end surface to which the flange portions 31 and 41 are attached) of the igniter holding portion 22. Then, the flange portions 31 and 41 are held by the retractor, and contact between the flange portions 31 and 41 is maintained during the operation as well.

Second Embodiment

Figure 4:
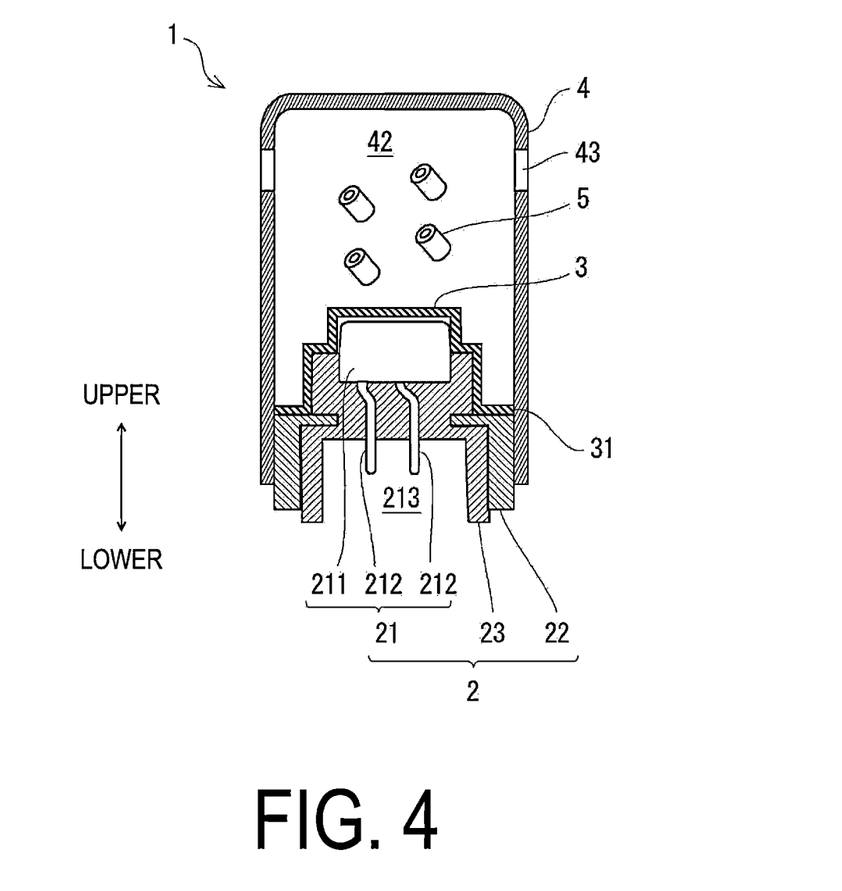
FIG. 4 is a schematic cross-sectional view in an axial direction illustrating an example of a gas generation device according to a second embodiment.

FIG. 4 is a schematic cross-sectional view illustrating an example of a gas generation device according to the second embodiment. The igniter assembly 1 according to the present embodiment also includes the ignition device 2, the partition wall 3, and the case 4. Note that constituent elements corresponding to constituent elements in the first embodiment described above are denoted by the same reference signs, and description will be omitted.

The case 4 of the igniter assembly 1 has an annular shape with an end portion 44 on the opening portion side extending downward, and does not include the flange portion 41 illustrated in FIG. 1. The igniter holding portion 22 is inserted inside the case 4, and the case 4 is welded all around to the igniter holding portion 22. In the present embodiment, the flange portion 31 of the partition wall 3 and the igniter holding portion 22 may be connected by welding. Even with such a configuration, it is possible to prevent moisture from entering from between the resin portion 23 and surrounding members, and ensure airtightness of the combustion chamber 42.

Manufacturing Method

In the case of the present embodiment, the ignition device 2 is covered with the partition wall 3, and the ignition device 2 and the partition wall 3 are welded. That is, the upper surface of the igniter holding portion 22 and the flange portion 31 of the partition wall 3 are connected by being fused by laser welding or the like. After the case 4 is filled with the transfer charge 5 and the ignition device 2 and the partition wall 3 are inserted into the case 4, the case 4 and the igniter holding portion 22 are continuously welded (all-around welding) in the circumferential direction from the outer peripheral surface. Note that it is preferable to weld all around, from the outside, the part where the flange portion 31 of the partition wall 3 and the igniter holding portion 22 come into contact with the case 4 because the welding work is required only once. When the igniter assembly 1 of FIG. 4 is also used alone as a gas generator, the case 4, the partition wall 3, and the igniter holding portion 22 are fixed as described above.

Gas Generation Device

Figure 5:
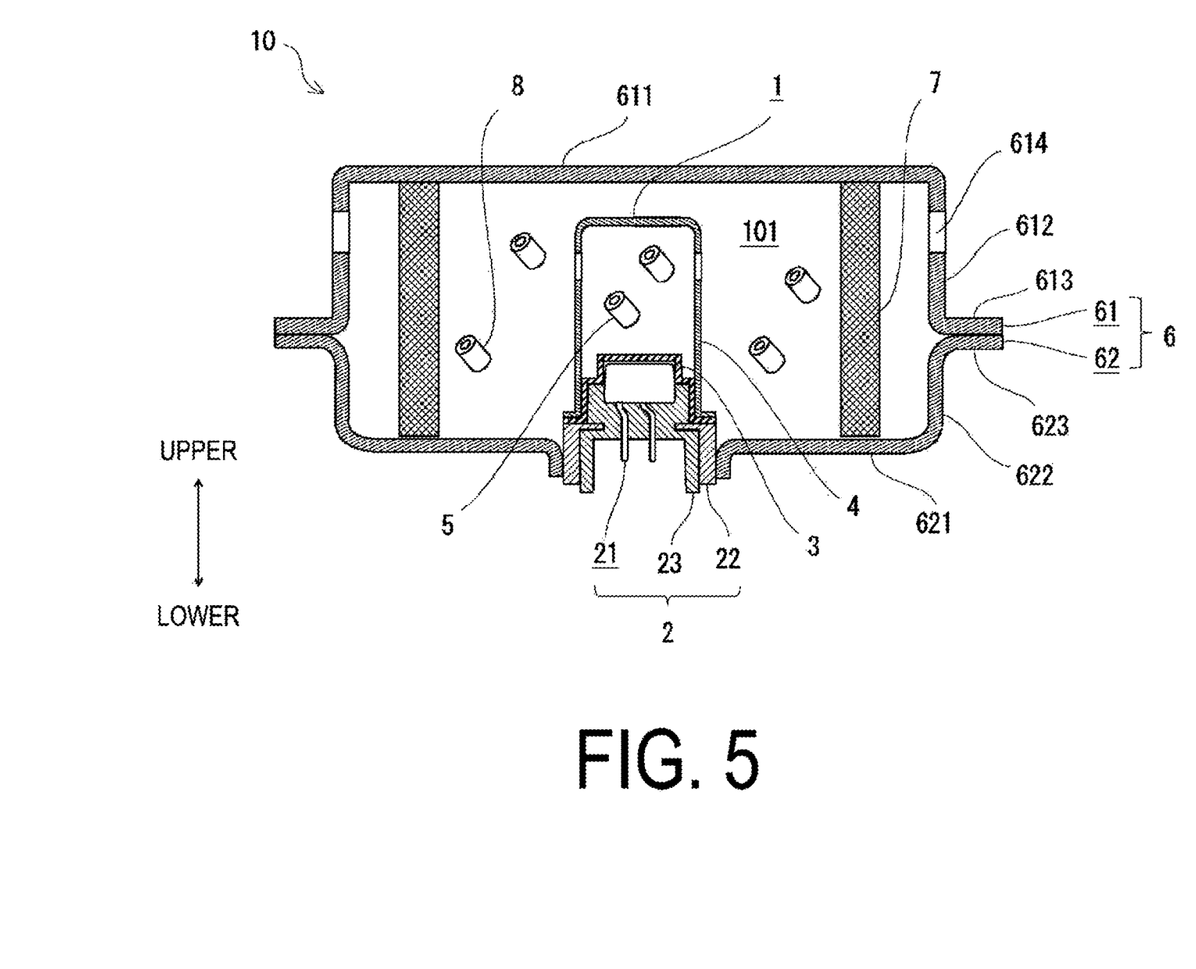
FIG. 5 is a schematic cross-sectional view in an axial direction illustrating an example of a gas generation device including an igniter assembly according to the present disclosure.

FIG. 5 is a schematic cross-sectional view illustrating an example of a gas generation device including the igniter assembly according to the present disclosure. A gas generation device 10 includes the igniter assembly 1, the housing 6, and a filter 7. The gas generation device illustrated in FIG. 5 is a so-called single type device including one igniter assembly 1. By operating the ignition device 2 disposed in the housing 6, the gas generation device 10 causes a second gas generating agent 8 filled inside the housing 6 to combust. Note that the gas generation device 10 illustrated in FIG. 5 includes the igniter assembly 1 illustrated in FIG. 1, but may include the igniter assembly 1 illustrated in FIG. 4 instead. However, when the igniter assemblies of FIGS. 1 and 4 are used as an ignition means in the gas generation device 10, the welding states of the case 4 with the partition wall 3 and the igniter holding portion 22 may be different as described later.

Housing

As illustrated in FIG. 5, the housing 6 is formed in a short tubular shape in which both ends in the axial direction are closed by joining, in a state where the opening ends face each other, an upper shell 61 and a lower shell 62 made of metal each formed in a bottomed tubular shape. However, the configuration of the upper shell 61 and the lower shell 62 is not limited to this, and a known one can be used as appropriate.

The upper shell 61 includes a tubular upper tube portion 612 having a tubular shape, a top plate portion 611 that closes an upper end of the upper tube portion 612, and a flange-shaped joint portion 613 extending radially outward from a lower end portion of the upper tube portion 612. The lower shell 62 includes a tubular lower tube portion 622 having a tubular shape, a bottom plate portion 621 that closes a lower end of the lower tube portion 622, and a flange-shaped joint portion 623 extending radially outward from an upper end portion of the lower tube portion 622. The joint portion 613 of the upper shell 61 and the joint portion 623 of the lower shell 62 are overlapped and joined by welding or the like, thereby forming the housing 6. In the upper tube portion 612 of the upper shell 61, a plurality of gas discharge ports 614 communicating the inside and the outside of the housing 6 are formed side by side along the circumferential direction. Before the operation of the gas generation device 10, the gas discharge ports 614 are closed by a closing member such as a seal tape (not illustrated).

The igniter holding portion 22 of the igniter assembly 1 is connected to the lower shell 62 of the housing 6. The igniter holding portion 22 may be a metal collar joined to the bottom plate portion 621 by all-around welding. Note that the igniter holding portion 22 may be formed integrally with the bottom plate portion 621. That is, the metal igniter holding portion 22 may be formed by a part of the lower shell 62 of the housing 6. The igniter holding portion 22 is provided protruding from the bottom plate portion 621 upward, inside of the housing 6. The igniter holding portion 22 constitutes the ignition device 2 illustrated in FIG. 1 or FIG. 4.

Filter

The filter 7 is formed in a tubular shape, and is disposed between the igniter assembly 1 and the gas discharge port 614 in a state where the upper end portion is supported by the top plate portion 611 of the upper shell 61 and the lower end portion is supported by the bottom plate portion 621 of the lower shell 62. Due to this, a combustion chamber 101 is formed between the igniter assembly 1 and the filter 7. The combustion chamber 101 is filled with the second gas generating agent 8 that combusts by the operation of the igniter assembly 1. The second gas generating agent 8 is ignited by the combustion gas of the transfer charge 5 (first gas generating agent) that combusted by the operation of the igniter assembly 1, and generates combustion gas. The filter 7 is configured to allow the combustion gas to pass therethrough, and the combustion gas in the combustion chamber 101 is cooled by passing through the filter 7. At this time, the filter 7 filters the combustion gas by collecting the combustion residue of the combustion gas.

Gas Generating Agent

For the second gas generating agent 8, that which is the same as or similar to the transfer charge 5 can be used. However, the second gas generating agent 8 is not limited to the above either. The transfer charge 5 and the second gas generating agent 8 may be gas generating agents of the same type, the same shape, and the same dimensions, or may be gas generating agents of different types, different shapes, and different dimensions.

Operation

In a state where the gas generation device 10 is assembled to an automobile or the like, a connector (not illustrated) inserted into the connector insertion space 213 is connected to the pair of electro-conductive pins 212 and 212, and power can be supplied to the igniter body 21. In this state, when a sensor (not illustrated) mounted on the automobile or the like detects an impact, power from an external power source (not illustrated) is supplied to the pair of electro-conductive pins 212 and 212 via the connector, and the ignition charge in the cup body 211 combusts.

As the pressure in the cup body 211 increases with the combustion of the ignition charge, the cup body 211 ruptures, and high-temperature flame and gas that are combustion products of the ignition charge are released. Due to this, the partition wall 3 also ruptures, and the transfer charge 5 in the case 4 is ignited. Then, the seal tape closing the communication holes 43 ruptures by the pressure of the combustion gas of the transfer charge 5. The combustion gas of the transfer charge 5 is discharged from the communication holes 43 to the combustion chamber 101.

The second gas generating agent 8 is ignited by the combustion gas of the transfer charge discharged from the communication holes 43 to the combustion chamber 101, whereby the combustion gas of the second gas generating agent 8 is generated in the combustion chamber 101. The combustion gas in the combustion chamber 101 is cooled and filtered by the filter 7, then breaks the seal tape closing the gas discharge port 614, and is released from the gas discharge port 614 to the outside of the housing 6. Due to this, for example, the airbag is inflated.

In the example of FIG. 5, the igniter assembly 1 is used as an ignition means in the gas generation device 10. Then, the igniter assembly 1 is disposed in the sealed housing 6. Therefore, moisture from the outside exclusively enters from between the electro-conductive pin 212 and the resin portion 23 and between the igniter holding portion 22 and the resin portion 23. Therefore, in the igniter assembly in the example of FIG. 5, welding all around the partition wall 3 and the igniter holding portion 22 can prevent moisture from entering. Joining of the case 4 and the partition wall 3 may be by all-around welding but need not be by all-around welding, and may be by other known fixing methods.

Gas Generation Device 2

Figure 6:
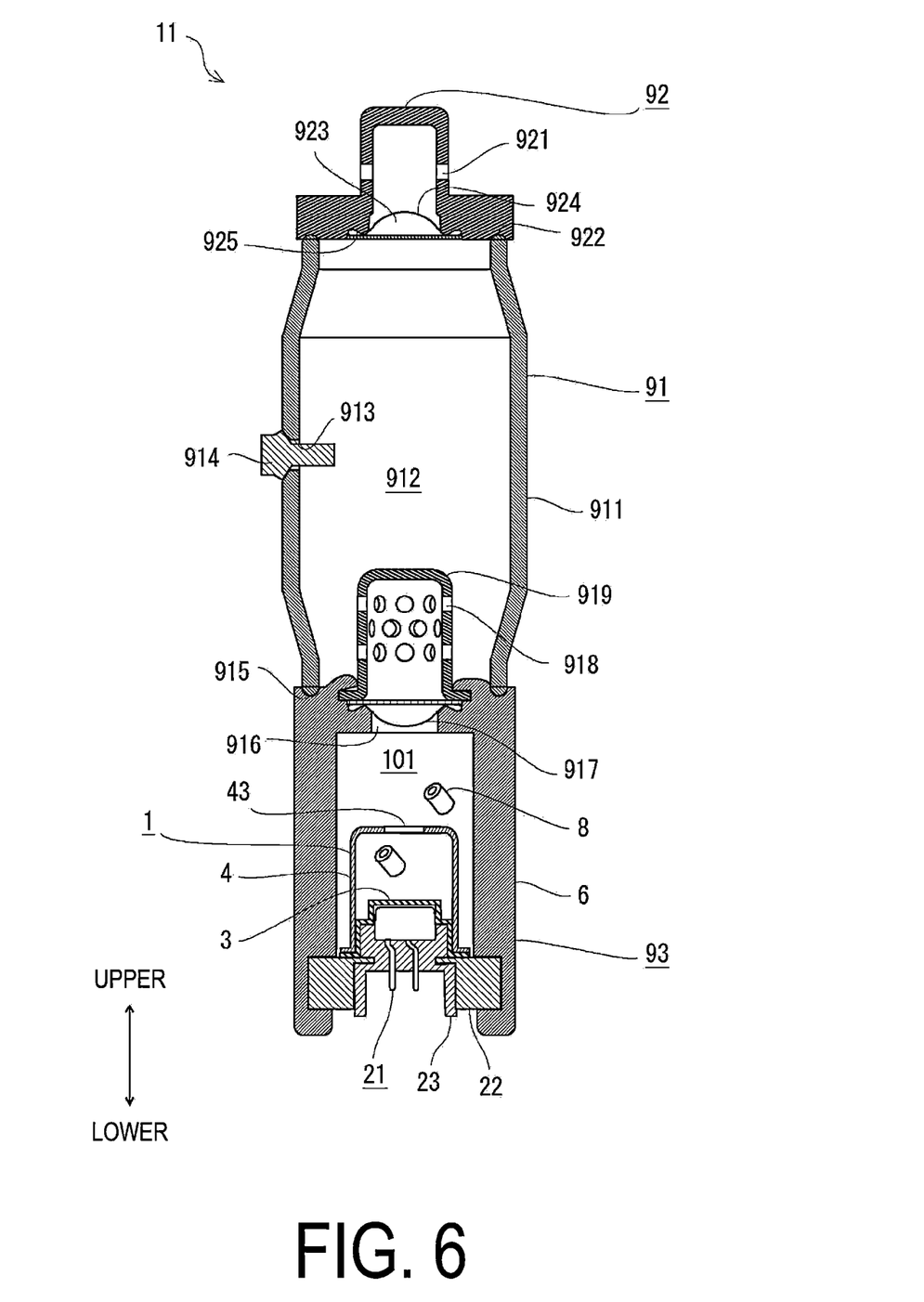
FIG. 6 is a schematic cross-sectional view in an axial direction illustrating an example of a gas generation device according to a variation.

FIG. 6 is a schematic cross-sectional view illustrating an example of a gas generation device according to a variation. Note that constituent elements corresponding to constituent elements in the gas generation device 10 described above are denoted by the same reference signs, and description will be omitted. A gas generation device 11 according to the variation includes a pressurized gas portion 91, a diffuser portion 92, and an ignition portion 93 including the igniter assembly 1. Note that the gas generation device 11 illustrated in FIG. 6 includes the igniter assembly 1 illustrated in FIG. 1, but may include the igniter assembly 1 illustrated in FIG. 4 instead. In this case as well, the welding states of the case 4 with the partition wall 3 and the igniter holding portion 22 may be different as described later. A sealing means such as a known O-ring closes the space between the ignition portion 93 and the igniter holding portion 22.

The pressurized gas portion 91 includes a tubular first housing 911 forming an outer shell, and a pressurized gas chamber 912 filled with a pressurized gas is formed inside the first housing 911. The pressurized gas filled in the pressurized gas chamber 912 may be a pressurized gas including, for example, argon, helium, or a mixture of them. A filling hole 913 for the pressurized gas is formed in a side surface of the first housing 911, and the filling hole 913 is closed by a closing pin 914 in a state where the pressurized gas is filled in the pressurized gas chamber 912 through the filling hole 913.

The ignition portion 93 includes a tubular second housing 6 forming an outer shell, and the second gas generating agent 8 is accommodated in the combustion chamber 101 formed inside the second housing 6. The igniter assembly 1 is accommodated on one end side of the second housing 6, and the other end side of the second housing 6 is connected to one end side of the pressurized gas portion 91. The housing 6 and the first housing 911 are welded at a joint portion 915. Note that as illustrated in FIG. 6, the communication hole 43 provided in the case 4 of the igniter assembly 1 may be provided in the upper surface of the case 4.

A first communication hole 916 between the pressurized gas portion 91 and the ignition portion 93 is closed by a cup-shaped first rupture plate 917 (also called a "first closing member"), and the inside of the ignition portion 93 is held at normal pressure. The first rupture plate 917 is welded to the second housing 6 at a peripheral portion.

The first rupture plate 917 is covered, from the pressurized gas portion 91 side, with a cap 919 including gas discharge ports 918. By covering the first rupture plate 917, the cap 919 is attached to a position where the combustion gas generated by the combustion of the second gas generating agent 8 is ejected from the gas discharge ports 918.

The cap 919 includes a flange portion of which the opening peripheral portion protrudes outward in a flange shape, and is fixed by crimping a part of the housing 6 at the flange portion.

The diffuser portion 92 including gas discharge ports 921 for discharging the pressurized gas and the combustion gas is connected to the other end side of the pressurized gas portion 91, and the diffuser portion 92 and the first housing 911 are welded at a joint portion 922. The diffuser portion 92 is a cap-shaped member including a plurality of the gas discharge ports 921 through which gas passes.

A second communication hole 923 between the pressurized gas portion 91 and the diffuser portion 92 is closed by a second rupture plate 924 (also called a "second closing member"), and the inside of the diffuser portion 92 is held at normal pressure. The second rupture plate 924 is welded to the diffuser portion 92 at a peripheral portion 925.

Operation

For example, when an automobile collides and receives an impact, the igniter assembly 1 operates by an operation signal output means, and causes the second gas generating agent 8 to combust and generate combustion gas. Thereafter, by a pressure rise inside the second housing 6 due to the combustion gas, the first rupture plate 917 ruptures, and the combustion gas flows into the cap 919 and is ejected from the gas discharge ports 918. The second rupture plate 924 is destroyed by a pressure rise in the pressurized gas chamber 912, and the pressurized gas and the combustion gas pass through the second communication hole 923 and are discharged from the gas discharge ports 921, inflating, for example, the airbag.

In the example of FIG. 6, as in FIG. 5, the igniter assembly 1 is used as a gas generator incorporated as an ignition device, and thus the welding states of the case 4, the partition wall 3, and the igniter holding portion 22 are the same as those in FIG. 5.

Gas Generation Device 3

Figure 7:
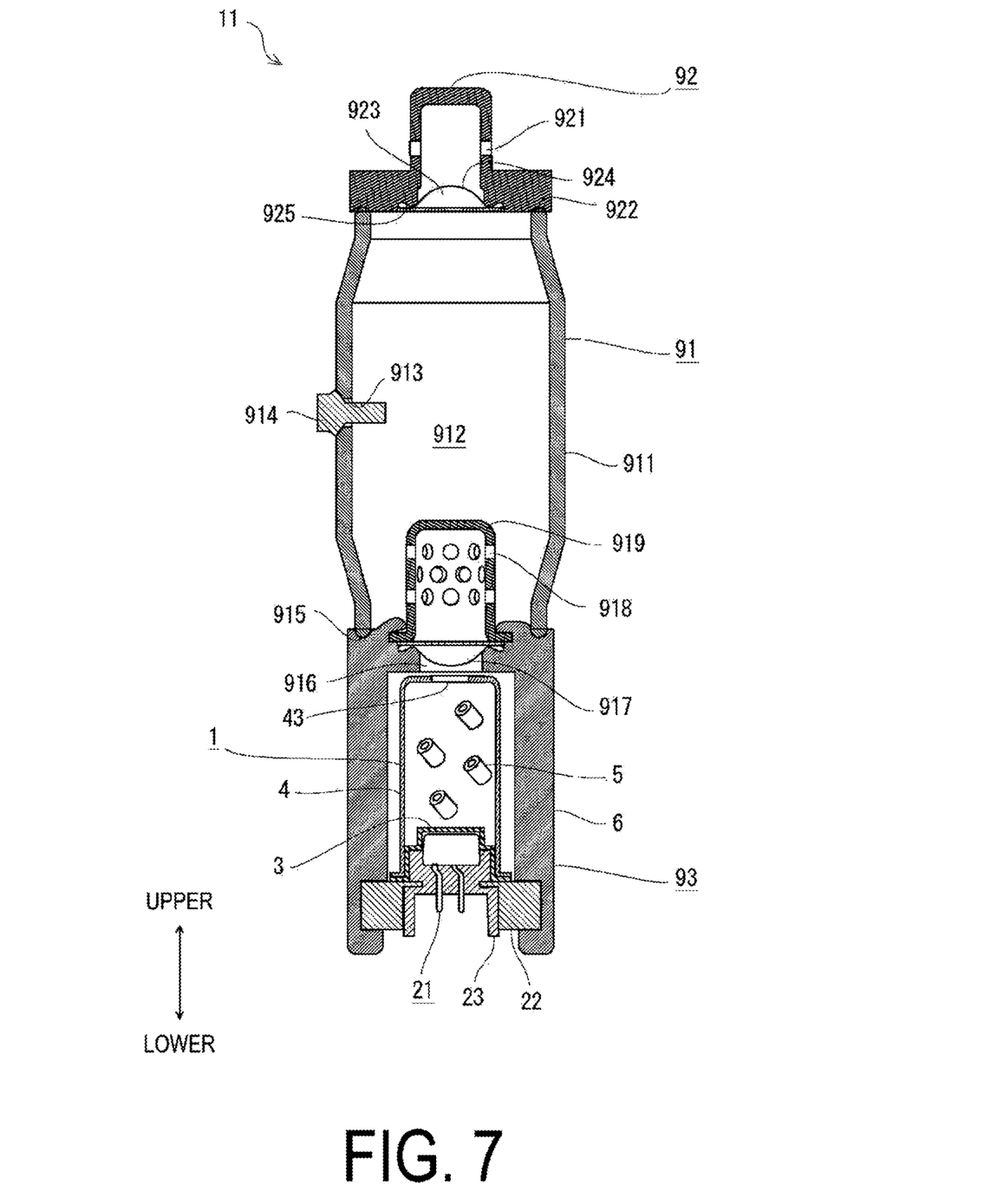
FIG. 7 is a schematic cross-sectional view in an axial direction illustrating an example of a gas generation device according to a variation.

FIG. 7 is a schematic cross-sectional view illustrating an example of a gas generation device according to a variation. Note that constituent elements corresponding to constituent elements in the gas generation devices 10 and 11 described above are denoted by the same reference signs, and description will be omitted. The gas generation device 11 according to the present variation also includes the pressurized gas portion 91, the diffuser portion 92, and the ignition portion 93 including the igniter assembly 1 illustrated in FIG. 1 or FIG. 4. Note that the gas generation device 11 illustrated in FIG. 7 also includes the igniter assembly 1 illustrated in FIG. 1, but may include the igniter assembly 1 illustrated in FIG. 4 instead. In this case as well, as illustrated in FIG. 6, the welding states of the case 4, the partition wall 3, and the igniter holding portion 22 are the same as those in FIG. 5.

The ignition portion 93 according to the present variation is disposed with the communication hole 43 of the case 4 and the first rupture plate 917 facing each other. The ignition portion 93 does not include the combustion chamber 101 that accommodates the second gas generating agent 8. Then, the ignition portion 93 ruptures the first rupture plate 917 by the combustion product of the transfer charge 5. The gas generation device 11 may have such a configuration. In the example of FIG. 7, as in FIG. 5, the igniter assembly 1 is used as a gas generator incorporated as an ignition device, and thus the welding states of the case 4, the partition wall 3, and the igniter holding portion 22 are the same as those in FIG. 5.

Variation of Igniter Assembly

Figure 8:
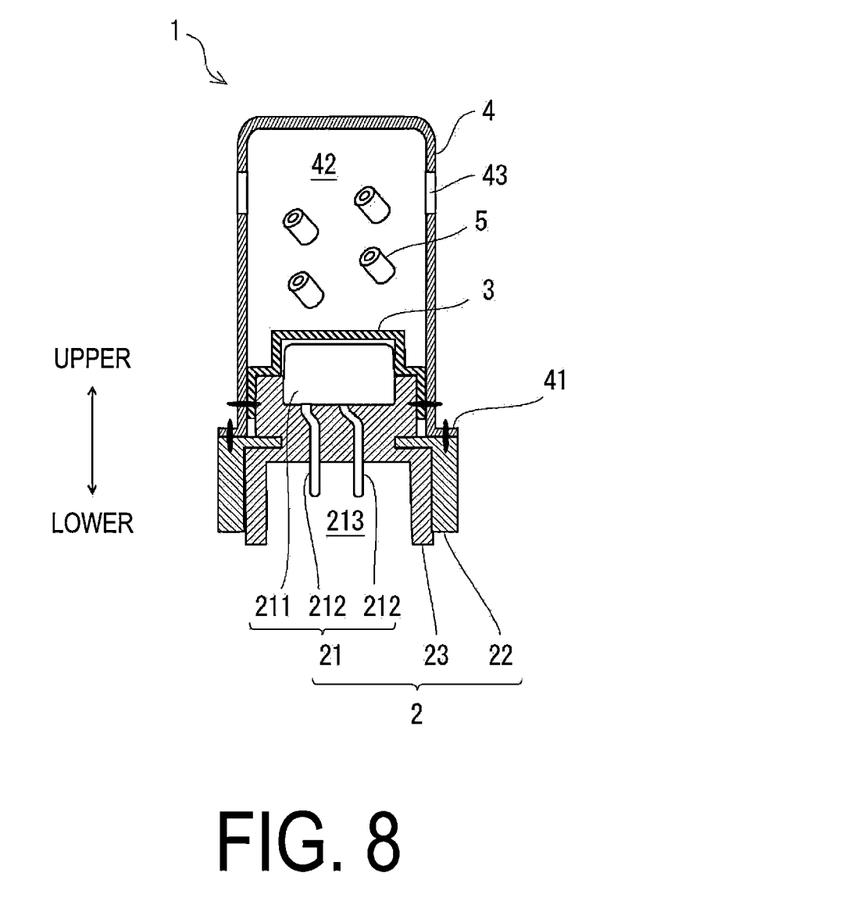
FIG. 8 is a schematic cross-sectional view in an axial direction illustrating a variation of an igniter assembly.

FIG. 8 is a schematic cross-sectional view in an axial direction illustrating a variation of an igniter assembly. Note that constituent elements corresponding to constituent elements in the first embodiment described above are denoted by the same reference signs, and description will be omitted.

In the example of FIG. 8, the partition wall 3 is welded all around to the case 4. The case 4 is fixed to the igniter holding portion 22 by welding. The case 4 may be connected to the igniter holding portion 22 by crimping. As illustrated in FIG. 8, the partition wall 3 does not include the flange portion 31 of FIG. 1 or the like, and the partition wall 3 is not in contact with the igniter holding portion 22. Even with such an aspect, it is possible to ensure airtightness of the combustion chamber 42.

To sum up the above, by separating, by the partition wall 3, the space in which the igniter body 21 and the resin portion 23 are disposed and the space in which the transfer charge 5 is accommodated, it is possible to ensure airtightness of the combustion chamber 42 in which the transfer charge 5 is accommodated even if the resin portion 23 shrinks during curing. At this time, the partition wall 3 is desirably fixed in a state of being in contact with the case 4, and thus one end of the combustion chamber 42 is closed. It is preferable that the partition wall 3 be welded all around to at least one of the igniter holding portion 22 or the case 4. For example, as in the first embodiment, the second embodiment, and the above-described variation, by welding all around the partition wall 3 and the case 4, it is possible to ensure airtightness of the combustion chamber 42 formed inside the case 4. As illustrated in FIG. 5 and the like, in a case of providing a product in which the igniter assembly 1 is accommodated in the sealable housing 6, when the igniter holding portion 22 and the housing 6 are welded all around, even if the partition wall 3 and the igniter holding portion 22 are welded all around, it is possible to ensure airtightness of a space formed inside the partition wall 3 and the housing 6 including the combustion chamber 42.

Others

Although the igniter assemblies and the gas generation devices according to some embodiments of the present disclosure have been described above, each aspect disclosed in the present description can be combined with any other feature disclosed in the present description. In the above embodiments, the single type gas generation device including one igniter assembly 1 has been described as an example, but the technique of the present disclosure may be applied to a gas generation device including a plurality of the igniter assemblies 1 of the present disclosure. The igniter assembly 1 may be applied to a device other than a gas generation device for a seat belt retractor or an airbag.

The resin portion 23 illustrated in FIGS. 1 to 7 may be a resin injection molded and cured between the igniter body 21 and the igniter holding portion 22. When the igniter body 21 and the igniter holding portion 22 are integrated by injection molding, a gap may be formed between the igniter holding portion 22 and the resin portion 23 or between the igniter body 21 and the resin portion 23 after the resin is cured. However, according to the igniter assembly 1 described above, it is possible to suppress entry of moisture from the gap.

In the manufacturing methods illustrated in FIGS. 2 and 3, the flange portion 41 is the outermost peripheral portion of the case 4, and the flange portion 31 is the outermost peripheral portion of the partition wall 3. That is, the outermost peripheral portions of the case 4 and the partition wall 3 are brought into contact with each other. Then, the contact portion between these outermost peripheral portions may be welded all around to the igniter holding portion 22. In particular, by setting the welding part in the igniter holding portion 22 to a position as far as possible from the gas generating agent 8 in the housing 6 and the resin portion 23, it is possible to reduce the influences of heat generated by welding such as deterioration or erroneous ignition of the gas generating agent 8, and deformation of the resin portion 23.

In the second embodiment illustrated in FIG. 4, the case 4 and the partition wall 3 may be welded. That is, the side surface that is the outermost peripheral portion of the case 4 and the outermost peripheral portion of the flange portion 31 of the partition wall 3 are welded all around together with the igniter holding portion 22. In the second embodiment as well, by setting the welding part to a radially outer part of the tubular igniter assembly 1, the welded part is positioned as far as possible from the gas generating agent 8 in the housing 6 and the resin portion 23, making it possible to reduce the influences of heat generated by welding such as deterioration or erroneous ignition of the gas generating agent 8, and deformation of the resin portion 23.

In the gas generation device 11 illustrated in FIGS. 6 and 7, the igniter assembly 1 may also be fixed by crimping as with the cap 919. That is, the igniter assembly 1 can be inserted into the ignition portion 93 with the flange portions 31 and 41 being in contact with an annular step portion formed inside the lower end side of the ignition portion 93, and can be fixed by crimping the lower end portion of the ignition portion 93 with the flange portions 31 and 41 held.

REFERENCE SIGNS LIST

1: Igniter assembly
2: Ignition device
21: Igniter body
211: Cup body
212: Electro-conductive pin
213: Connector insertion space
22: Igniter holding portion
23: Resin portion
3: Partition wall
31: Flange portion
4: Case
41: Flange portion
5: Transfer charge (first gas generating agent)
10, 11: Gas generation device
101: Combustion chamber
6: Housing (second housing)
61: Upper shell
62: Lower shell
7: Filter
8: Second gas generating agent
91: Pressurized gas portion
92: Diffuser portion
93: Ignition portion

The invention claimed is:

1. An igniter assembly comprising:
an ignition device including,
an igniter including an ignition portion airtightly accommodating an ignition charge, and a conductive portion that supplies an ignition current for igniting the ignition charge,
an igniter holding portion having a tubular shape and holding the igniter in a state of surrounding the igniter, and
a fixing member made of a resin, interposed between the igniter and the igniter holding portion, and fixing the igniter to the igniter holding portion;
a case having a bottomed tubular shape and accommodating a first gas generating agent and the ignition portion of the igniter, on one side in an axial direction of the igniter holding portion; and
a partition wall partitioning an inside of the case into a space in which the igniter and the fixing member are disposed and a space in which the first gas generating agent is accommodated, the partition wall having moisture impermeability,
wherein each of the partition wall and the case comprise a flange portion, wherein the flange portion of the partition wall and the flange portion of the case extend around a circumference of the igniter assembly,
wherein the flange portion of the partition wall and the flange portion of the case are welded together around the circumference such that the partition wall is fixed in a state of being in contact with the case.

2. The igniter assembly according to claim 1, wherein a thickness of the partition wall is thinner than a thickness of the igniter holding portion and a thickness of the case.

3. The igniter assembly according to claim 1, wherein the partition wall is made of the same material as that of the igniter holding portion or the case.

4. The igniter assembly according to claim 1, wherein the partition wall has a cup shape including an opening portion opened in one direction, includes an annular portion protruding outward in a radial direction of the cup shape at an edge end of the opening portion, and is received in the case with the annular portion exposed to an outside, and
the annular portion is connected to the igniter holding portion or the case by all-around welding.

5. The igniter assembly according to claim 1, wherein the partition wall is welded to the igniter holding portion and the case.

6. The igniter assembly according to claim 1, wherein the partition wall is welded all around to the case.

7. A gas generation device comprising:
the igniter assembly according to claim 1;
a housing accommodating the igniter assembly and provided with a gas discharge port; and
a second gas generating agent filled in the housing.

8. The gas generation device according to claim 7, wherein
the partition wall is welded all around to the igniter holding portion, and
the igniter holding portion of the igniter assembly is welded all around to the housing.

9. A gas generation device comprising:
a first housing that has a tubular shape, that is filled with a pressurized gas, and of which both ends in an axial direction are each closed by a closing member;
a second housing connected to one end of both ends in the axial direction of the first housing; and
the igniter assembly according to claim 1 accommodated in the second housing.

10. The gas generation device according to claim 9, wherein
the second housing includes a second gas generating agent to be ignited and combusted by a combustion product generated by the igniter assembly.

11. The gas generation device according to claim 10, wherein
the case having the bottomed tubular shape includes, at a closed bottom portion, a through hole through which a combustion product of the first gas generating agent passes, and
the through hole and the closing member closing one end of both ends in the axial direction of the first housing are disposed facing each other.

12. The igniter assembly according to claim 6, wherein
the case includes a first flange provided on the one side in the axial direction of the igniter holding portion, the flange protrudes laterally over the entire circumference thereof,
the partition wall includes a second flange protruding laterally over an entire circumference at an end of the opening portion thereof,
the first flange is connected to the second flange by all-around welding.

13. The igniter assembly according to claim 12, wherein
The first flange and the second flange are welded to the igniter holding portion.

14. The igniter assembly according to claim 12, wherein
the first flange and the second flange are crimped by a part of the igniter holding portion.

15. The gas generation device according to claim 9, wherein the igniter assembly is inserted into the second housing with a first flange and a second flange being in contact with an annular step portion formed inside the second housing, and is fixed by crimping an end portion of the second housing with the first flange and the second flange.

16. An igniter assembly comprising:
an ignition device including,
an igniter including an ignition portion airtightly accommodating an ignition charge, and a conductive portion that supplies an ignition current for igniting the ignition charge,
an igniter holding portion having a tubular shape and holding the igniter in a state of surrounding the igniter, and
a fixing member made of a resin, interposed between the igniter and the igniter holding portion, and fixing the igniter to the igniter holding portion;
a case having a bottomed tubular shape and accommodating a first gas generating agent and the ignition portion of the igniter, on one side in an axial direction of the igniter holding portion; and
a partition wall partitioning an inside of the case into a space in which the igniter and the fixing member are disposed and a space in which the first gas generating agent is accommodated, the partition wall having moisture impermeability, wherein
the partition wall is fixed in a state of being in contact with the case, and is welded around a perimeter to at least one of the igniter holding portion and the case, and
wherein the first gas generating agent is disposed on a first side of the partition wall and the ignition charge is disposed on the second side of the partition wall so as the partition wall to directly face the ignition portion.

17. A gas generation device comprising:
the igniter assembly according to claim 16;
a housing comprising a gas discharge port;
a second gas generating agent, and
wherein the igniter assembly and the second gas generating agent are disposed in the housing.

18. An igniter assembly comprising:
an ignition device including,
an igniter including an ignition portion airtightly accommodating an ignition charge, and a conductive portion that supplies an ignition current for igniting the ignition charge,
an igniter holding portion having a tubular shape and holding the igniter in a state of surrounding the igniter, and
a fixing member made of a resin, interposed between the igniter and the igniter holding portion, and fixing the igniter to the igniter holding portion;
a case having a bottomed tubular shape and accommodating a first gas generating agent and the ignition portion of the igniter, on one side in an axial direction of the igniter holding portion; and
a partition wall partitioning an inside of the case into a space in which the igniter and the fixing member are disposed and a space in which the first gas generating agent is accommodated, the partition wall having moisture impermeability, and the partition wall directly facing the ignition portion.

19. A gas generation device comprising:
the igniter assembly according to claim 18;
a housing comprising a gas discharge port;
a second gas generating agent, and
wherein the igniter assembly and the second gas generating agent are disposed in the housing.

* * * * *